US012174007B2

(12) United States Patent
Pryce et al.

(10) Patent No.: US 12,174,007 B2
(45) Date of Patent: *Dec. 24, 2024

(54) HAND-HELD TIRE SCANNER AND METHOD FOR OBTAINING A THREE-DIMENSIONAL SURFACE PROFILE OF A TIRE

(71) Applicant: SNAP-ON EQUIPMENT S.R.L. A UNICO SOCIO, Correggio (IT)

(72) Inventors: Andrew Pryce, Weston-on-the-Green (GB); Björn Gustafsson, Weston-on-the-Green (GB); Kshitij Sisodia, Weston-on-the-Green (GB); Allen Pearson, Huntingdon (GB)

(73) Assignee: SNAP-ON EQUIPMENT SRL A UNICO SOCIO, Correggio (IT)

(*) Notice: Subject to any disclaimer, the term of this patent is extended or adjusted under 35 U.S.C. 154(b) by 0 days.

This patent is subject to a terminal disclaimer.

(21) Appl. No.: 18/320,609

(22) Filed: May 19, 2023

(65) Prior Publication Data

US 2023/0288192 A1    Sep. 14, 2023

Related U.S. Application Data

(63) Continuation of application No. 17/037,899, filed on Sep. 30, 2020, now Pat. No. 11,692,814, which is a
(Continued)

(30) Foreign Application Priority Data

Apr. 25, 2016    (GB) ...................... 1607166

(51) Int. Cl.
*G01B 11/22*    (2006.01)
*B60C 11/24*    (2006.01)
(Continued)

(52) U.S. Cl.
CPC ............ *G01B 11/22* (2013.01); *B60C 11/243* (2013.01); *B60C 11/246* (2013.01); *B60C 99/00* (2013.01);
(Continued)

(58) Field of Classification Search
CPC .. G01M 17/02; G01M 17/021; G01M 17/022; G01M 17/027; G01M 17/025;
(Continued)

(56) References Cited

U.S. PATENT DOCUMENTS 5,895,845  A    4/1999   Bürger
5,987,978  A    11/1999  Whitehead
(Continued)

FOREIGN PATENT DOCUMENTS

CA    3073147 A1    9/2020
WO    2015153954 A1    10/2015

OTHER PUBLICATIONS

Non-Final Office Action for U.S. Appl. No. 16/096,284, mailed Feb. 10, 2020, 9 pages.
(Continued)

*Primary Examiner* — Andre J Allen
(74) *Attorney, Agent, or Firm* — Withrow + Terranova, PLLC; Vincent K. Gustafson

(57)    ABSTRACT

A hand-held device for obtaining a three-dimensional topological surface profile of a tire, the device comprising: a base comprising an aperture; a light source arranged in use to generate an elongate pattern of light, and to project said pattern through the aperture onto a rolling surface of the tire; a detector arranged to image a region of the rolling surface of the tire; a plurality of pairs of guide wheels mounted on respective axles mounted on the base, wherein the guide
(Continued)

wheels on adjacent axles are linked by gears; and a rotary encoder arranged to generate a signal corresponding to rotation of an axle.

25 Claims, 11 Drawing Sheets

Related U.S. Application Data continuation of application No. 16/096,284, filed as application No. PCT/GB2017/051155 on Apr. 25, 2017, now Pat. No. 10,837,762.

(51) Int. Cl.
*B60C 99/00* (2006.01)
*G01B 11/25* (2006.01)
*G01M 17/02* (2006.01)

(52) U.S. Cl.
CPC ............ *B60C 99/006* (2013.01); *G01B 11/25* (2013.01); *G01M 17/027* (2013.01)

(58) Field of Classification Search
CPC ...... G01M 17/024; G01M 17/10; G01M 7/08; G01M 17/0076; G01M 17/013; G01M 17/03; G01M 17/04; G01M 17/06; G01M 17/08; G01M 1/02; G01M 1/045; G01M 1/12; G01M 1/225; G01M 3/40; G01M 5/0091; G01M 7/02; G01M 99/00; G01M 99/002; B60C 23/0494; B60C 2019/004; B60C 23/0493; B60C 19/00; B60C 23/04; B60C 23/0498; B60C 23/064; B60C 23/0488; B60C 23/0496; B60C 23/0408; B60C 23/041; B60C 23/0411; B60C 23/20; B60C 23/0486; B60C 23/06; B60C 11/243; B60C 11/246; B60C 23/061; B60C 99/00; B60C 11/0083; B60C 13/003; B60C 2009/2038; B60C 23/00; B60C 23/003; B60C 23/004; B60C 23/02; B60C 23/0401; B60C 23/0406; B60C 23/0416; B60C 23/0433; B60C 23/0455; B60C 23/0459; B60C 23/0474; B60C 23/0489; B60C 23/0491; B60C 25/002; B60C 25/005; B60C 25/007; B60C 29/02; B60C 3/04; B60C 99/006; B60C 11/0332; B60C 11/24; B60C 13/001; B60C 13/02; B60C 15/0036; B60C 17/02; B60C 2009/0071; B60C 2009/2022; B60C 2200/02; B60C 2200/06; B60C 2200/065; B60C 23/001; B60C 23/007; B60C 23/008; B60C 23/0413; B60C 23/0427; B60C 23/0447; B60C 23/0454; B60C 23/0457; B60C 23/0462; B60C 23/0467; B60C 23/0471; B60C 23/0472; B60C 23/0476; B60C 23/0479; B60C 23/0484; B60C 23/065; B60C 23/066; B60C 23/10; B60C 25/0548; B60C 25/056; B60C 25/132; B60C 25/138; B60C 25/18; B60C 29/005; B60C 9/005; B60C 9/18; B60C 9/1807; B60C 9/20; B60C 9/28
USPC ................................................. 73/146–146.8
See application file for complete search history.

(56) References Cited

U.S. PATENT DOCUMENTS

| | | |
|---|---|---|
| 6,789,416 B1 | 9/2004 | Tracy et al. |
| 7,578,180 B2 | 8/2009 | Lionetti et al. |
| 8,625,105 B2 | 1/2014 | Pryce et al. |
| 10,837,762 B2 | 11/2020 | Pryce et al. |
| 11,692,814 B2 | 7/2023 | Pryce et al. |
| 2009/0040533 A1 | 2/2009 | Takahashi et al. |
| 2010/0180676 A1 | 7/2010 | Braghiroli et al. |
| 2012/0008148 A1 | 1/2012 | Pryce et al. |
| 2014/0270466 A1 | 9/2014 | Dam et al. |
| 2015/0330773 A1 | 11/2015 | Uffenkamp et al. |
| 2016/0029006 A1 | 1/2016 | Zoken et al. |
| 2017/0052021 A1 | 2/2017 | Rhoades |

OTHER PUBLICATIONS

Notice of Allowance for U.S. Appl. No. 16/096,284, mailed Jul. 1, 2020, 8 pages.
Non-Final Office Action for U.S. Appl. No. 17/037,899, mailed Feb. 18, 2022, 7 pages.
Non-Final Office Action for U.S. Appl. No. 17/037,899, mailed May 24, 2022, 10 pages.
Notice of Allowance for U.S. Appl. No. 17/037,899, mailed Feb. 22, 2023, 8 pages.
Extended European Search Report for European Patent Application No. 20167283.9, mailed Nov. 20, 2020, 5 pages.
Extended European Search Report for European Patent Application No. 22153052.0, mailed Jan. 25, 2023, 6 pages.
International Search Report and Written Opinion for International Patent Application No. PCT/GB2017/051155, mailed Jul. 7, 2017, 13 pages.

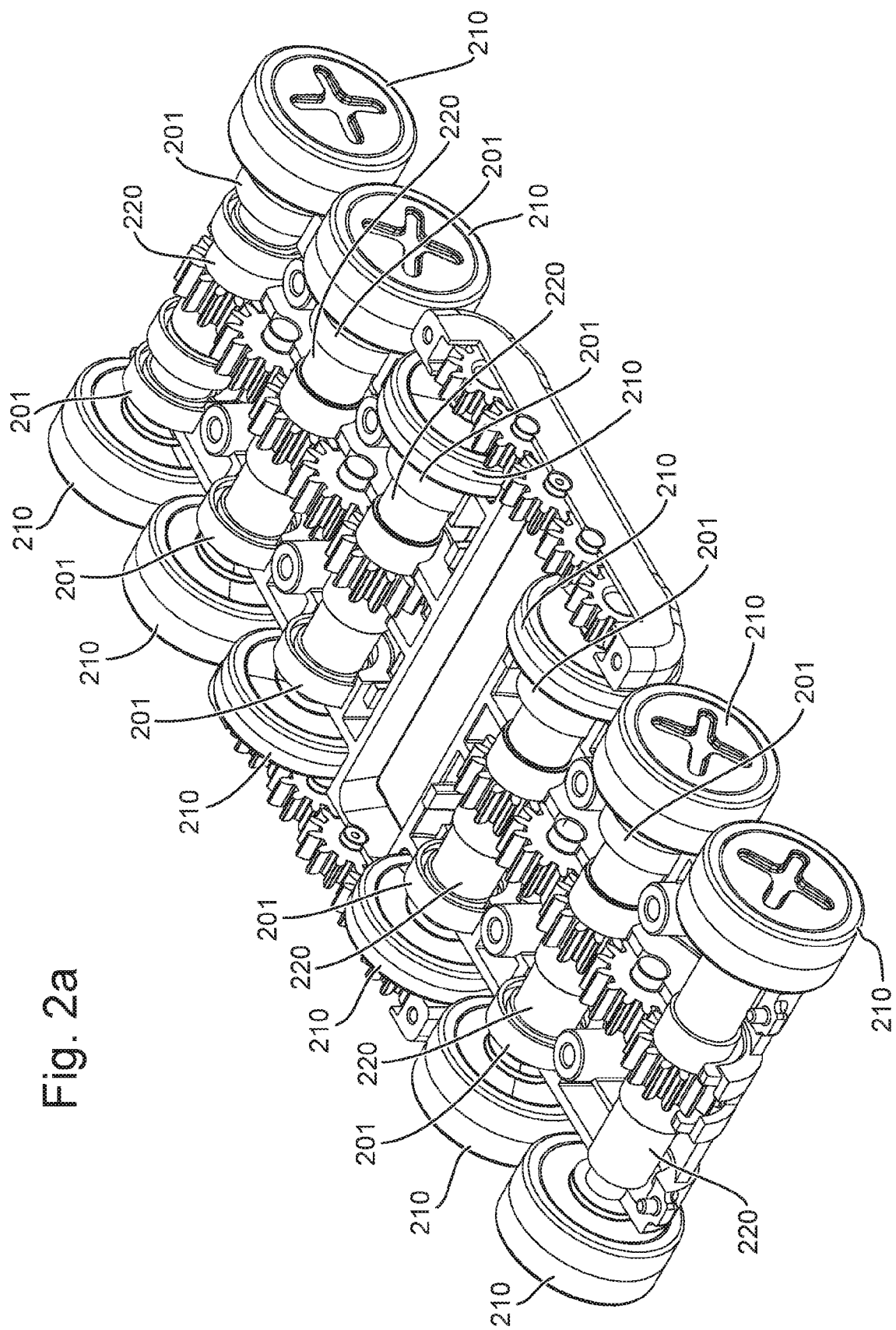

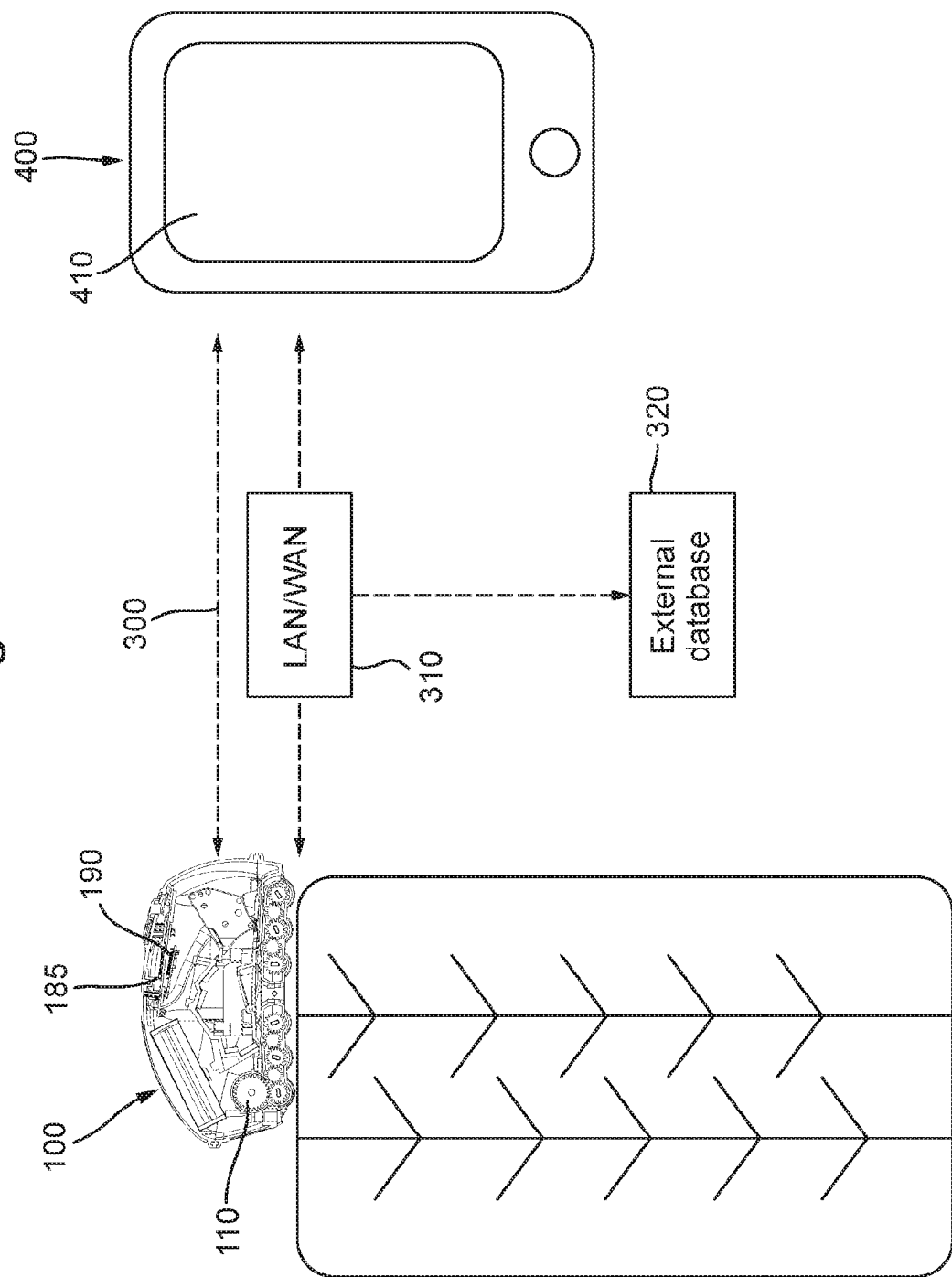

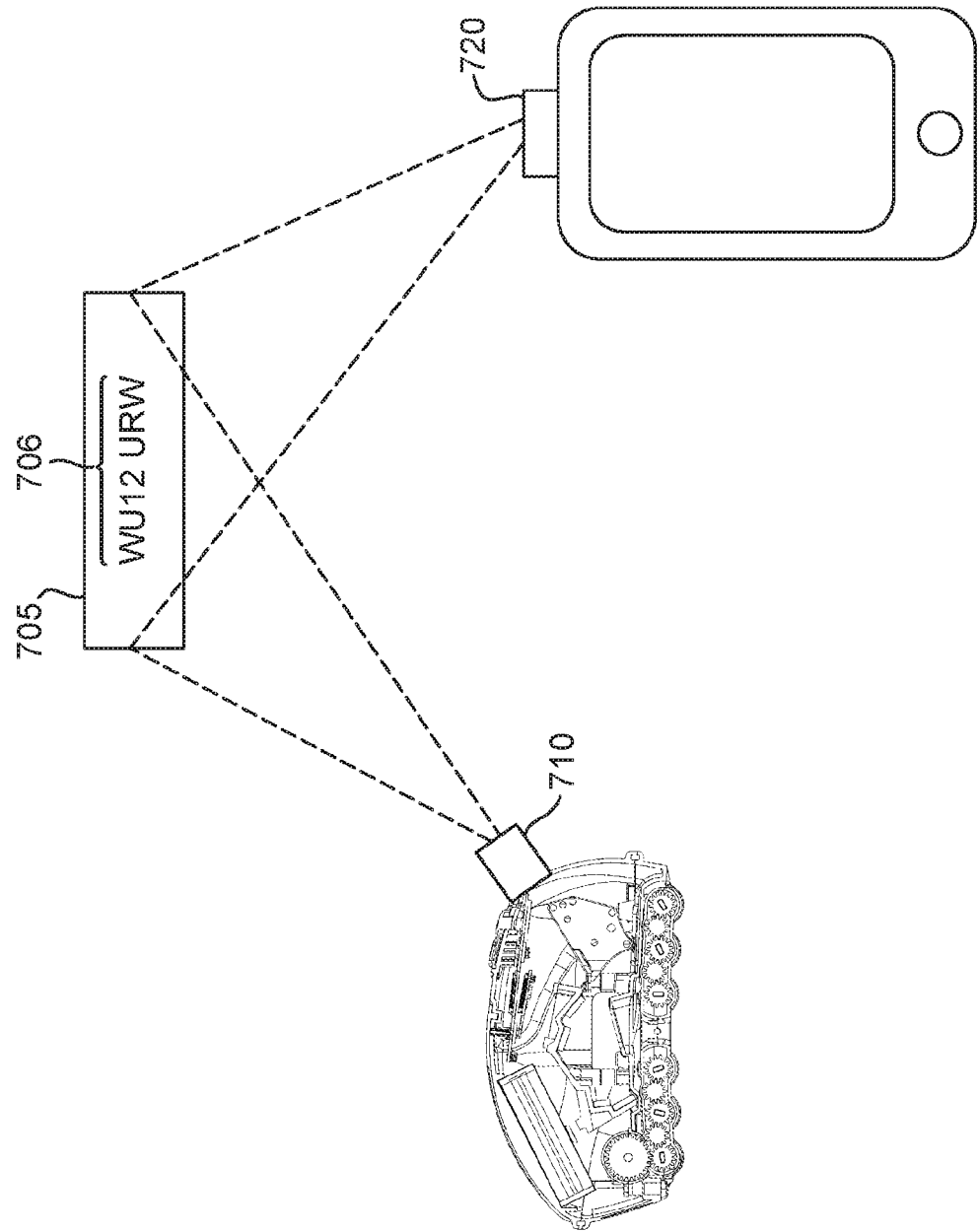

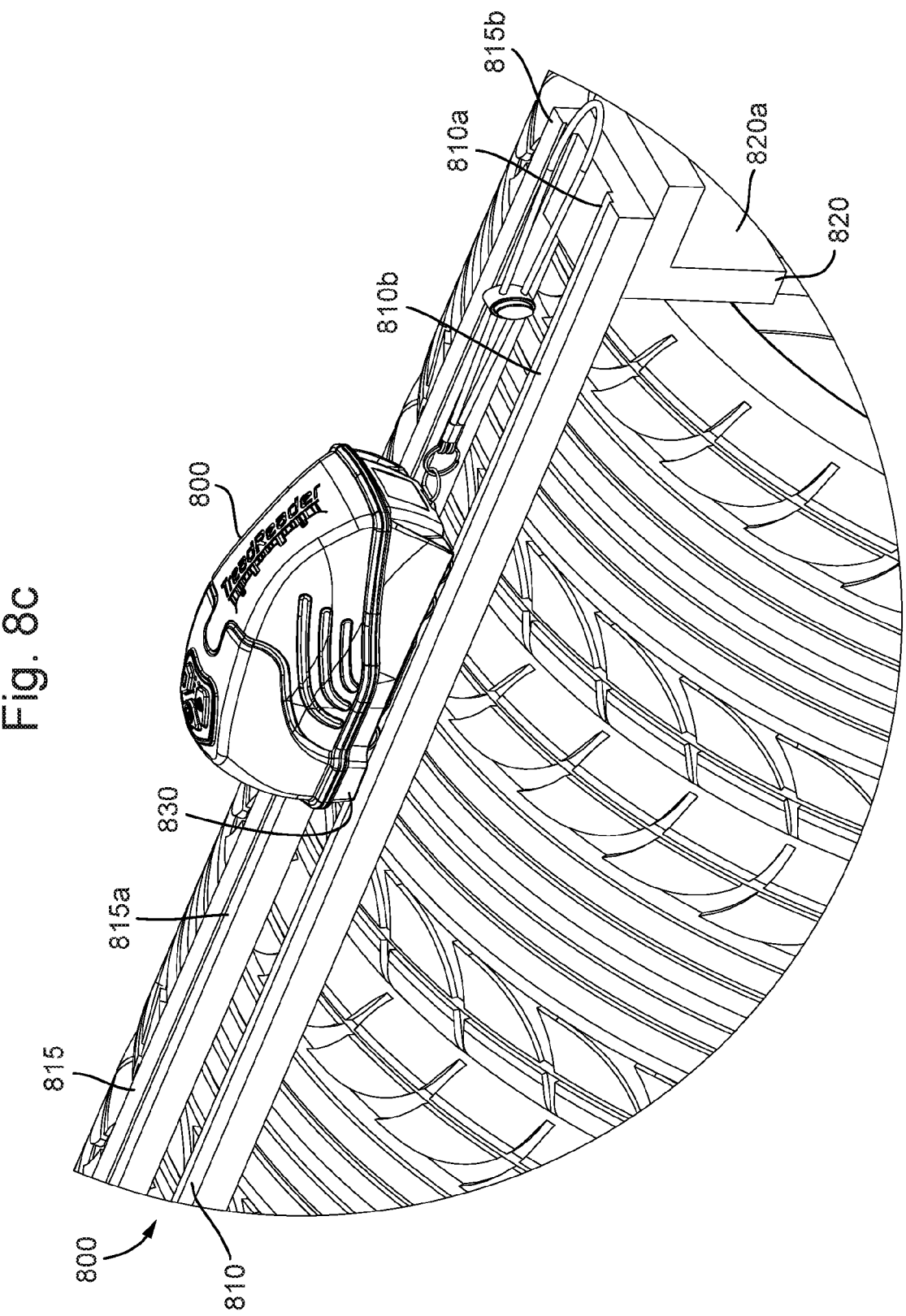

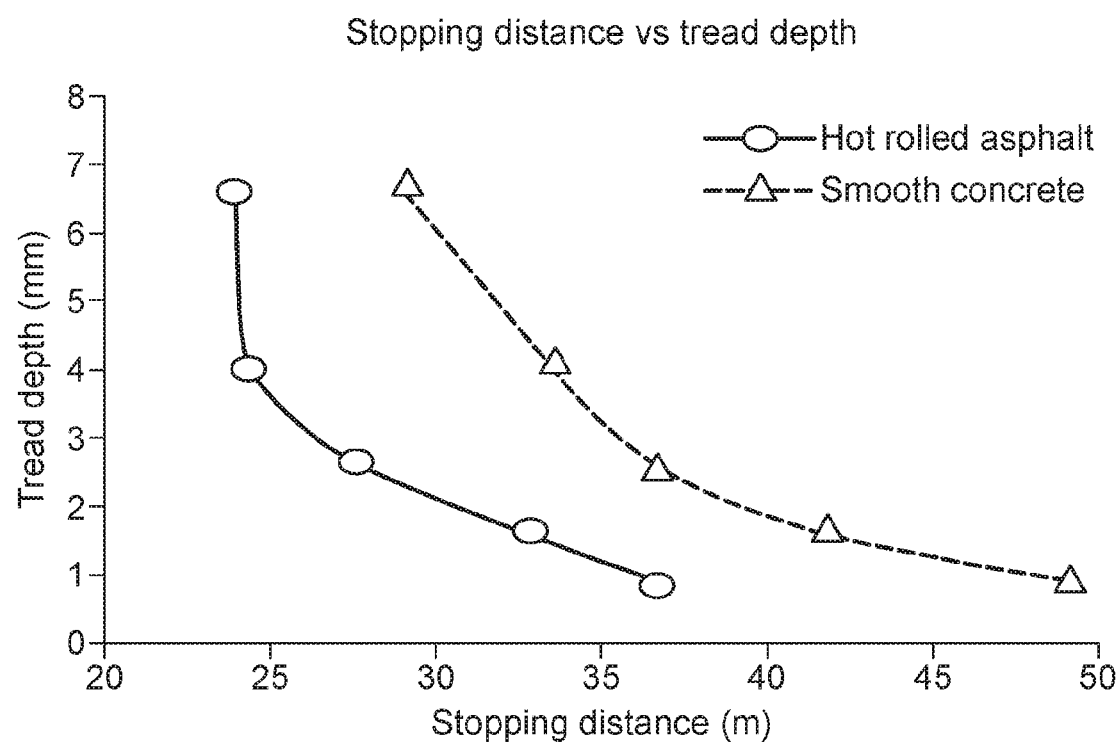

HAND-HELD TIRE SCANNER AND METHOD FOR OBTAINING A THREE-DIMENSIONAL SURFACE PROFILE OF A TIRE

This application is a continuation of U.S. patent application Ser. No. 17/037,899 filed on Sep. 30, 2020 and subsequently issued as U.S. Pat. No. 11,692,814 on Jul. 4, 2023, which is a continuation of U.S. patent application Ser. No. 16/096,284 filed on Oct. 24, 2018 and subsequently issued as U.S. Pat. No. 10,837,762 on Nov. 17, 2020, which is a 35 U.S.C. § 371 national phase filing of International Application No. PCT/GB2017/051155 filed on Apr. 25, 2017, and claims the benefit of United Kingdom Patent Application No 1607166.4, filed on Apr. 25, 2016, wherein the disclosures of the foregoing patents and applications are hereby incorporated by reference herein in their respective entireties.

The invention relates to a hand-held device suitable for, and a method for obtaining, a three-dimensional topological profile of a tire surface.

Tires for road-going vehicles are typically formed with a pattern of grooves, known as tread, for displacing water from between the tire and the road surface in order to improve traction in wet conditions. Since the amount of traction provided by a tire decreases as the depth of the tread (i.e. depth of the grooves) wears away, national laws often prescribe a minimum tread depth. It is therefore important to inspect the surface of a tire to ensure the tread depth does not fall below any such safety limits.

It is also important to inspect the surface profile of a tire, particularly over areas of the tire that contact the road, for assessing how the tire wears under certain weather, road, and vehicle driving conditions such as, for example, different wheel alignment configurations.

An object of the present invention is to provide an improved apparatus and method for inspecting the surface profile of a tire.

From a first aspect, the invention provides a hand-held device for obtaining a three-dimensional topological surface profile of a tire, the device comprising: a
  base comprising an aperture;
  a light source arranged in use to generate an elongate pattern of light, and to project said pattern through the aperture onto a rolling surface of the tire;
  a detector arranged to image a region of the rolling surface of the tire;
  a plurality of pairs of guide wheels mounted on respective axles mounted on the base, wherein the guide wheels on adjacent axles are linked by gears; and
  a rotary encoder arranged to generate a signal corresponding to rotation of an axle.

From a second aspect, the invention provides a method of obtaining data for generating a three-dimensional topological surface profile of a tire, using a hand-held device, the method comprising:
  generating an elongate pattern of light;
  projecting said pattern through an aperture in a base of the hand-held device onto a rolling surface of the tire;
  imaging a region of the rolling surface of the tire;
  moving the device over the rolling surface of the tire on a plurality of pairs of guide wheels mounted on respective axles mounted on the base, wherein the guide wheels on adjacent axles are linked by gears; and
  using a rotary encoder to generate a signal corresponding to rotation of an axle.

Thus it will be seen by those skilled in the art that in accordance with the invention a device and method can be used to obtain a three-dimensional topological surface profile of a tire using a rotary encoder to determine relative movement between the device and the tire.

The detector may be arranged so as to image at least of portion of the projected pattern reflected from the rolling surface of the tire. The detector may be a CMOS detector, a COD detector, or any other detector suitable for imaging laser light reflected from the rolling surface of a tire.

Projecting an elongate pattern of light onto a rolling surface of the tire and imaging a region of said surface enables the surface topology of the tire (e.g. the depth/height profile of the tire) in that region to be measured.

More particularly, projecting an elongate pattern of light onto a rolling surface of the tire and imaging at least of portion of the projected pattern reflected from the rolling surface of the tire enables the surface topology of the tire (e.g. the depth/height profile of the tire) in that region to be measured.

In some embodiments, the elongate pattern of light is a line of light and the detector is arranged to image at least a portion of the projected line of light on the rolling surface of the tire. The generated line and imaged line pattern enable distortion-based surface depth measurements to be made by, for example, examining the extent of any displacements and/or discontinuities (which typically arise at regions where the projected light beam falls incident into a groove or onto a protrusion) between the imaged line pattern and the generated line. Whilst other elongate patterns of light can of course be used with such distortion-based surface depth measurements, simple straight lines are advantageous as they can provide accurate depth measurements resulting from good distortion/discontinuity for a given change in tire depth/height as well as simplifying the required image processing.

The plurality of pairs of guide wheels mounted on the base allows the device to move more easily along the surface of the tire. In particular, by rotating along the surface of the tire they allow the device to more easily move over bumps and grooves on the tire's surface. Furthermore, by separating the base from the surface of the tire, the guide wheel arrangement prevents the base from catching on bumps and grooves and thereby causing imaging errors. In this way, the guide wheels further help the device to move more easily along the surface of the tire whilst also minimizing imaging errors and subsequent distortion-based surface depth measurement errors.

As will be appreciated by those skilled in the art, the axle and its corresponding guide wheels will rotate by an amount proportional to the distance travelled by the device on the rolling surface of the tire. That is, a 360 degree rotation of the axle moves the device by an amount equal to the outer circumference of the guide wheel (e.g. 10 cm). Of course the wheels on different axles could have different diameters.

At least one of the guide wheels may be mounted on its respective axle via a respective wheel bearing such as a roller bearing, a ball bearing or a pinion bearing. Preferably, each of the guide wheels is mounted on its respective axle via a respective wheel bearing. The wheel bearing allows the guide wheel to rotate more freely about the axle and prevents the guide wheel from sticking as the hand-held device is rolled across the tire surface. Preventing the guide wheel from sticking in this way also ensures that the gear linkage (and in turn the neighboring wheel) does not jam. In addition, it has been found that the wheel bearing makes the rotation of the guide wheel more tolerant to dirt entering the axle-guide wheel assembly.

In some embodiments, the guide wheel is removably mounted on the wheel bearing. Additionally or alternatively, the wheel bearing may be removably mounted on the axle. In this way, the guide wheel/bearing may be easily detached and replaced/serviced.

By arranging the rotary encoder to generate a signal corresponding to the rotation of an axle, it is possible to measure the distance travelled by the device. In this way, the device can output the distance it travels along the surface of the tire, together with the imaging data. Providing the distance travelled with the imaging data makes it possible to map the information on the surface topology of the tire (e.g. the depth/height profile of the tire) to a particular location which allows a three-dimensional topological surface profile of the tire to be generated. As will be explained further below, the data could be exported from the device for remote analysis or the device itself may be arranged to generate the 3D surface profile.

The rotary encoder is arranged to generate a signal corresponding to the rotation of the axle. It could be directly coupled to the axle in order to do this or it could be directly coupled to a guide wheel which is in turn coupled to the axle.

The rotary encoder may be arranged to generate a signal for every full or partial revolution of an axle or guide wheel. In other words it may generate a single or multiple signals per revolution.

Optionally, the device may comprise a second rotary encoder, the second rotary encoder being arranged to generate a signal corresponding to the rotation of a different axle. In this case, the device may be arranged to combine signals representing the two different axles, e.g. by averaging them. This may be helpful in reducing errors.

A potential difficulty that the Applicant has identified with moving a device of this type over bumps, surface depressions, sidewall regions of the tire, and other such curved regions is that some of the guide wheels could lose contact with the surface of the tire and stop rotating as the device is being moved. However, linking the guide wheels on adjacent axles by gears in accordance with the invention can avoid this problem and the resultant erroneous movement data as the coupled guide wheels thus rotate together when any one of the guide wheels is rotated. This provides a number of benefits, including enabling the rotary encoder to generate a signal corresponding to the rotation of an axle even when the axle's associated guide wheels lose contact with the surface of the tire. In this way, the device is able to keep track of the distance it is moved even when the axle's associated guide wheels lose contact with the tire surface, resulting in more reliable three-dimensional topological surface profile measurements.

When viewed from another aspect of the invention, rather than link the guide wheels on adjacent axles by gears, the guide wheels may be collectively rotated together by an alternative linking assembly such as, for example, a chain assembly. The chain assembly may comprise a sprocket arranged on each axle and one or more chains linking each sprocket together. Additionally or alternatively, the chain assembly may comprise one or more caterpillar tracks linking each guide wheel together.

Optionally, to improve the stability of the device while it is being moved on the surface of the tire, a first guide wheel pair may be mounted at the first end of the base and a second guide wheel pair may be mounted at the second end of the base. Improving the stability in this way also prevents the device from rocking about a guide wheel pair mounted between the first end and the second end of the base. This is advantageous because rocking may skew the projected pattern of light during imaging and thereby cause erroneous distortion-based surface depth measurements.

The guide wheels may be arranged such that they are parallel with the length of the base; the length of the base being the greatest dimension of the base.

The axles may be arranged parallel to each other.

The aperture may be arranged parallel with the axles. Alternatively, the aperture may be arranged at an acute angle relative to an adjacent axle.

Additionally or alternatively, the aperture may be located between adjacent axles. This advantageously ensures that the axles and their respective guide wheels do not obstruct the projected light path between the light source and the rolling surface of the tire, and the reflected (i.e. imaging) light path between the rolling surface of the tire and the detector.

The detector may image a region of the rolling surface of the tire through the aperture. In this way, the detector is arranged to image a region of the rolling surface of the tire by collecting the projected light pattern that reflects off the surface of the tire and passes through the aperture.

In a set of embodiments, the pairs of guide wheels are arranged in a concave arc extending in a direction perpendicular to the axles.

Arranging the pairs of guide wheels in a concave arc extending in a direction perpendicular to the axles enables the device to better conform to curved surfaces, such as a curved circumference of a tire. Specifically, the inventors have found that this arrangement may advantageously enable guide wheels on at least two adjacent axles to remain in direct contact with the surface of a tire when the device is moved around its circumference or across its width from sidewall to sidewall. In this way, the arrangement advantageously reduces the likelihood of the guide wheels losing contact with the surface of the tire.

As mentioned above the device may produce data for remote analysis elsewhere but in a set of embodiments, the hand-held device comprises at least one processor configured to generate a three-dimensional topological surface profile of the tire surface using data obtained from an image of the rolling surface of the tire and the signal generated by the rotary encoder. In a corresponding set of embodiments, the method may comprise generating a three-dimensional topological surface profile of the tire surface using data obtained from an image of the rolling surface of the tire and the signal generated by the rotary encoder.

In particular, the at least one processor may be configured to generate a three-dimensional topological surface profile of the tire surface using the imaging data from the detector and the signal generated by the rotary encoder.

The processor(s) may further be configured to identify tire side walls by analyzing the directionality of the signal generated by the rotary encoder to determine the position of an outer edge and an inner edge of the tire. More specifically when the user reverses direction upon reaching an edge of the tire, the device may be arranged to note this as the edge and to process the subsequent image data accordingly. Additionally of alternatively, the side walls of the tire may be identified based on the acquired imaging data itself. For example, from the acquired imaging data it may be possible to determine the three dimensional surface topology of the tire and therein the curved sidewall regions of the tire.

Accordingly, the method may also comprise identifying tire side walls by analyzing the directionality of the signal generated by the rotary encoder to determine the position of an outer edge and an inner edge of the tire The rotary encoder may take any convenient form e.g. optical, micro-switch, magneto-inductive etc. but in a set of embodiments, the rotary encoder is a magnetic encoder. Optionally, the magnetic encoder is disposed in a sealed housing in the device, e.g. with one or more magnets provided on one of the gears, axles, wheels etc. outside of the sealed housing.

Optionally for example, the one or more magnets may be provided on an inner surface of a guide wheel facing at least a portion of the magnetic encoder.

The magnetic rotary encoder may be arranged to output a signal every time a threshold magnetic field is sensed.

In some embodiments, the projected pattern of light is oriented in a direction transverse to a direction of travel of the device when the device is rolled on the guide wheels.

In some embodiments, the aperture is positioned centrally in the base.

In some embodiments, the hand-held device comprises a visual, audible and/or haptic indicator configured to provide visual, audible and/or haptic feedback—e.g. to indicate that a scan is complete, incomplete, or that insufficient, or poor data has been obtained from a scanned area. In this way, the device may provide intuitive indicators to a user on the status of the device or a scan.

In some embodiments, the base may be connected to a housing of the device via a hinge such that the base can be rotated away from the device to expose the aperture. In this way, the device may provide quick access to the aperture, light source, and/or detector. This is advantageous as the surface of the tire is often dirty and such dirt often needs to be cleaned from the aperture, light source, and/or detector to prevent it from obstructing the light path to and from the tire. Advantageously, the base and housing in such embodiments may be retained in a closed configuration by a quick release mechanism such as a clip.

In some embodiments, gears linking axles adjacent to the aperture may be displaced relative to other gears to accommodate the aperture.

The hand-held device may comprise a battery e.g. for powering the device and its components such as the processor(s) and/or the rotary encoder. The device may be configured to enter a low power or sleep mode when no signal is received from the rotary encoder. By entering a sleep mode or low power mode in this way, the device is more energy efficient and may be used for longer before needing to replace the battery.

In some embodiments, the hand-held device comprises a wireless transceiver for connecting to an external device such as smartphone, tablet computer, laptop, wireless access point or the like. In this way, the device may easily communicate with an external device to provide measurement data (e.g. imaging data obtained by the detector and the signal data generated by the encoder) and/or processed measurement data to the external device. For example, the wireless transceiver makes it possible for the device to provide the imaging data and the encoder signal data that it generated to a computer terminal, or cloud based network, for generating a three-dimensional topological surface profile of a tire. In this way, complex image processing processors can be remotely located and remotely powered and, as a result, it is possible to make the hand-held device more energy efficient and compact.

The wireless transceiver may be a Wi-Fi transceiver or other short range transceiver such as a Bluetooth™ transceiver, a ZigBee® transceiver, or an infrared transceiver.

The hand-held device may be arranged to establish a direct connection (such as a peer-to-peer connection) with the external device. In this case, it will be appreciated that the direct connection enables the hand-held device and external device to communicate directly (e.g. to share measurement data and/or processed measurements data) without being connected to a network router or the internet.

This is useful for scanning a tire in situations where such an internet/network connection is not available. However, additionally or alternatively, the hand-held device may be arranged to communicate with the external device via a Local Area Network (LAN) or a Wide Area Network (WAN). In this case, the LAN/WAN would enable the hand-held device to communicate with the external device over much larger distances than a direct connection (such as a direct Bluetooth™ connection).

In some embodiments, the hand-held device may receive a three-dimensional topological surface profile of a tire for storage. The three-dimensional topological surface profile of a tire may correspond to measurement data (e.g. imaging data and the signal data generated by the encoder) that the hand-held device has taken and communicated for generating the three-dimensional topological surface profile of a tire remotely.

In some embodiments, the hand-held device may communicate a generated three-dimensional topological surface profile of a tire to a display unit such as a monitor or a smartphone for display.

The hand-held device may comprise a processor and memory for storing computer executable instructions. The processor may execute the computer executable instructions. The executed computer instructions may direct the hand-held device to transmit measurement data and/or processed measurement data to the external device. Additionally or alternatively, the hand-held device may comprise a processor and dedicated hardware logic gates, separate from the processor. The hardware logic gates may be arranged to transmit measurement data and/or processed measurement data to the external device.

The external device may be arranged to generate a three-dimensional topological surface profile of a tire based on received data (e.g. measurement data) from the hand-held device.

Additionally or alternatively, the external device may be arranged to determine wheel alignment information of a tire based on received data (e.g. measurement data associated with a scanned tire) from the hand-held device. The wheel alignment information may indicate the alignment of the tire relative to a fixed frame of reference (e.g. relative to a vehicle axle or flat ground). In some preferred embodiments, the wheel alignment information (also referred to herein as tire alignment information) may be determined based on a generated 3D surface profile of the tire. In some embodiments, the wheel alignment information may be determined based on the relative tread depth between the center of the tire's rolling surface and one/both of the tire's sidewall(s).

The external device may be arranged to compare the wheel alignment information with the tire's optimum wheel alignment setting(s). Based on this comparison, the external device may output (e.g. display) one or more correction values for adjusting the alignment of the tire to its optimum wheel alignment setting(s). The optimum wheel alignment setting(s) may be pre-determined and, optionally, based on one or more of: tire make, tire size, tire age, tire wear-condition; and the type/condition of the vehicle on which the tire is fitted. The optimum wheel alignment setting(s) may be stored locally on the external device, or the external device may be arranged to retrieve the optimum wheel alignment setting(s) from an external database.

Additionally or alternatively, the external device may be arranged to determine tire inflation information based on the data received from the hand-held device. The tire inflation information may indicate the inflation level of the tire. In some embodiments, the tire inflation information is determined based on a generated three-dimensional topological surface profile of the tire. For example, the tire inflation information may be determined based on the relative tread depth in the 3D surface profile between the center of the tire's rolling surface and one/both of the tire's sidewall(s).

The external device may be arranged to compare the tire inflation information with the tire's optimum inflation settings. Based on this comparison, the external device may output (e.g. display) one or more correction values for adjusting the inflation of the tire to its optimum inflation setting. The optimum inflation setting may be pre-determined and, optionally, it may be based on one or more of: tire make, tire size, tire age, tire wear-condition; and the type/condition of the vehicle on which the tire is fitted. The optimum inflation setting may be stored locally on the external device, or the external device may be arranged to retrieve the optimum inflation setting from an external database.

The external device may additionally or alternatively output (e.g. display) an indicator as to whether the measured tire is under inflated or over inflated based on a comparison of the tire inflation information with the tire's optimum inflation settings.

Additionally or alternatively, the external device may be arranged to determine stopping distance information based on the received data from the hand-held device. Preferably, the external device is arranged to determine stopping distance information based on a pre-determined relationship between vehicle stopping distance and a received tread depth measurement. The predetermined relationship may correspond to an empirical relationship between tread depth and stopping distance such as that found by the British Rubber Manufacturers Association (BRMA) in 2003, or any other time before the filing of this application. FIG. 9 provides an example of an empirically found relationship between tread depth and stopping distance that may be used to determine stopping distance.

In some examples, the pre-determined relationship between measured tread depth and stopping distance may be given by:

$$D_{total} = D_{p-r} + D_{braking} = Vt_{p-r} + \frac{V^2}{2TF\mu g}$$

where:
$D_{total}$ is the stopping distance;
$D_{p-r}$ is the reaction/thinking distance;
$D_{braking}$ is the braking distance;
V is the vehicle speed; $t_{p-r}$ is
the reaction time;
μ is the coefficient of friction and is dependent on the measured tread depth; g is the gravitational constant.

In general, μ decreases with tread depth. This relationship between μ and tread depth may be linear or non-linear. Preferably, it is a non-linear function as defined by Olson et al in the National Cooperative Highway Research Program report 505, 2003, pf 46.

V and $t_{p-r}$ may each correspond to a pre-determined value or a pre-determined range of values. In the latter case, the stopping distance may be calculated for a range of vehicle speeds and/or reactions times based on the measured tread depth.

The measured tread depth may correspond to tread depth measurements obtained from a single tire or a plurality of tires. Preferably, the measured tread depth of the most worn tire in a set of measured tires is used to determine stopping distance information. However, in some cases, the measured tread depth may correspond to an average tread depth measurement across an area of a single tire or a plurality of tires.

Preferably, the external device is arranged to output (e.g. display) one or more of: received data from the hand-held device, and data determined/generated based on the received data from the hand-held device.

In other embodiments, it will be appreciated that the hand-held device may be used, or arranged, to process measurement data (e.g. imaging data and the signal data generated by the encoder) so as to determine one or more of: a three-dimensional topological surface profile of the tire; wheel alignment information; tire inflation information; and stopping distance information. The determined/generated data may be provided to the external device as processed measurement data.

Accordingly, in general, it will be seen that methods herein may use data obtained from an image of the rolling surface of the tire and the signal generated by the rotary encoder to determine one or more of: a three-dimensional topological surface profile of the tire; wheel alignment information; tire inflation information; and stopping distance information.

For example, some methods herein may comprise:
communicating data obtained from an image of the rolling surface of the tire and the signal generated by the rotary encoder to the external device; and
using the external device to determine one or more of: a three-dimensional topological surface profile of the tire; wheel alignment information; tire inflation information; and stopping distance information.

Alternatively, the methods herein may comprise using the hand-held device to determine one or more of: a three-dimensional topological surface profile of the tire; wheel alignment information; tire inflation information; and stopping distance information.

In some embodiments, information regarding a tire (which has been, or will be, measured by the hand-held device), and/or information regarding a vehicle in connection with the tire, may be received by the hand-held device and/or external device. The vehicle information may contain information such as the type(s) of tire(s) which may be fitted on the vehicle, the vehicle make, model, and year. The tire and/or vehicle information may contain optimum data such as a tire's optimum alignment setting(s) and inflating setting. The vehicle and/or tire information may additionally or alternatively contain information regarding the stopping distance of a vehicle when fitted with a tire of a certain type and setting. For example, the information regarding the stopping distance may contain a pre-determined stopping distance for a vehicle having a particular type of tire, together with information as to how this stopping distance changes with tread depth.

The hand-held device and/or external device may comprise a data input means to provide tire and/or vehicle information. The data input means may be a touch device (e.g. a keyboard or a touch screen), a serial input (e.g. a USB input) or a wireless input.

In some embodiments, the hand-held or external device may comprise a camera as a data input means. The camera may be arranged to image a vehicle registration plate. The hand-held device or external device may be arranged to determine the vehicle registration plate number from the image using an automatic number plate recognition (ANPR) algorithm. Such ANPR algorithms are known in the art. Based on a vehicle registration plate number, the hand-held or the external device may be adapted to retrieve vehicle information and/or tire information. For example, the hand-held or the external device may retrieve vehicle information and/or tire information associated with the vehicle registration plate number from local memory, or it may retrieve said information from an external database.

The external device and/or hand-held device may be arranged to use measurement data (or processed measurement data), together with vehicle information and/or tire information for use in any one or more of the above determinations (e.g. for use in the determination of the tire inflation information).

Accordingly, in general, it will be seen that methods herein may further comprise:
imaging a vehicle registration plate;
identifying the vehicle registration plate based on the image
retrieving vehicle information and/or tire information based on the identified vehicle registration plate; and
using said retrieved information to determine one or more of: a three-dimensional topological surface profile of the tire; wheel alignment information; tire inflation information; and stopping distance information.

In some embodiments, the hand-held device comprises a means arranged to move along a guide rail. For example, the hand-held device may comprise a contact surface arranged to slide along a guide rail for translation along the guide rail. The contact surface may be in direct contact with the guide rail, and optionally may comprise a lubricant. Additionally or alternatively, the hand-held device may comprise a pinion gear (which may be motorized) arranged to slidably attach to the guide rail so as to slide the hand-held device along the guide rail. In some arrangements, the wheels of the hand-held device may rotate along the guide rail.

The guide rail may be arranged to fit on the surface of a single tire or a stack of tires. In the latter case, the stack of tires may comprise a plurality of tires stacked on top of each other to form a tower. Preferably, the guide rail comprises outwardly extending flanges. The flanges may be spaced apart so as to fit one tire or a plurality of stacked tires between them. Preferably, the flanges grip the outermost tires in the stack of tires so as to securely attach the guide rail to the stack of tires. Alternatively, the flanges may grip the outer facing sides of a single tire.

In some arrangements, the guide rail is linear. In this way, moving the hand-held device along the guide rail provides linear movement to the hand-held device. Optionally, however, the guide rail may comprise a curved section. The curved section may curve over a sidewall of at least one tire. In this way, the curved section of the guide rail helps to improve scanning of a tire's sidewall.

The hand-held device may be movably attached to the rail, and is preferably removable from the rail. In use, the hand-held device may be slid/moved along the guide rail so as to move it over a rolling surface of a single tire or a stack of tires. Sliding/moving the hand-held device along the rail may provide more accurate linear-scanning of the tire than free-hand scanning.

Thus, methods herein may further comprise:
placing a guide rail in a fixed relationship relative to the rolling surface of the tire; and
moving the hand-held device along the guide rail as the device moves over the surface of the tire.

Certain embodiments of the invention will now be described, by way of example only, with reference to the accompanying drawings, in which:

FIG. 2a illustrates the arrangement of a guide wheel assembly comprising a wheel bearing;

Figure 1:
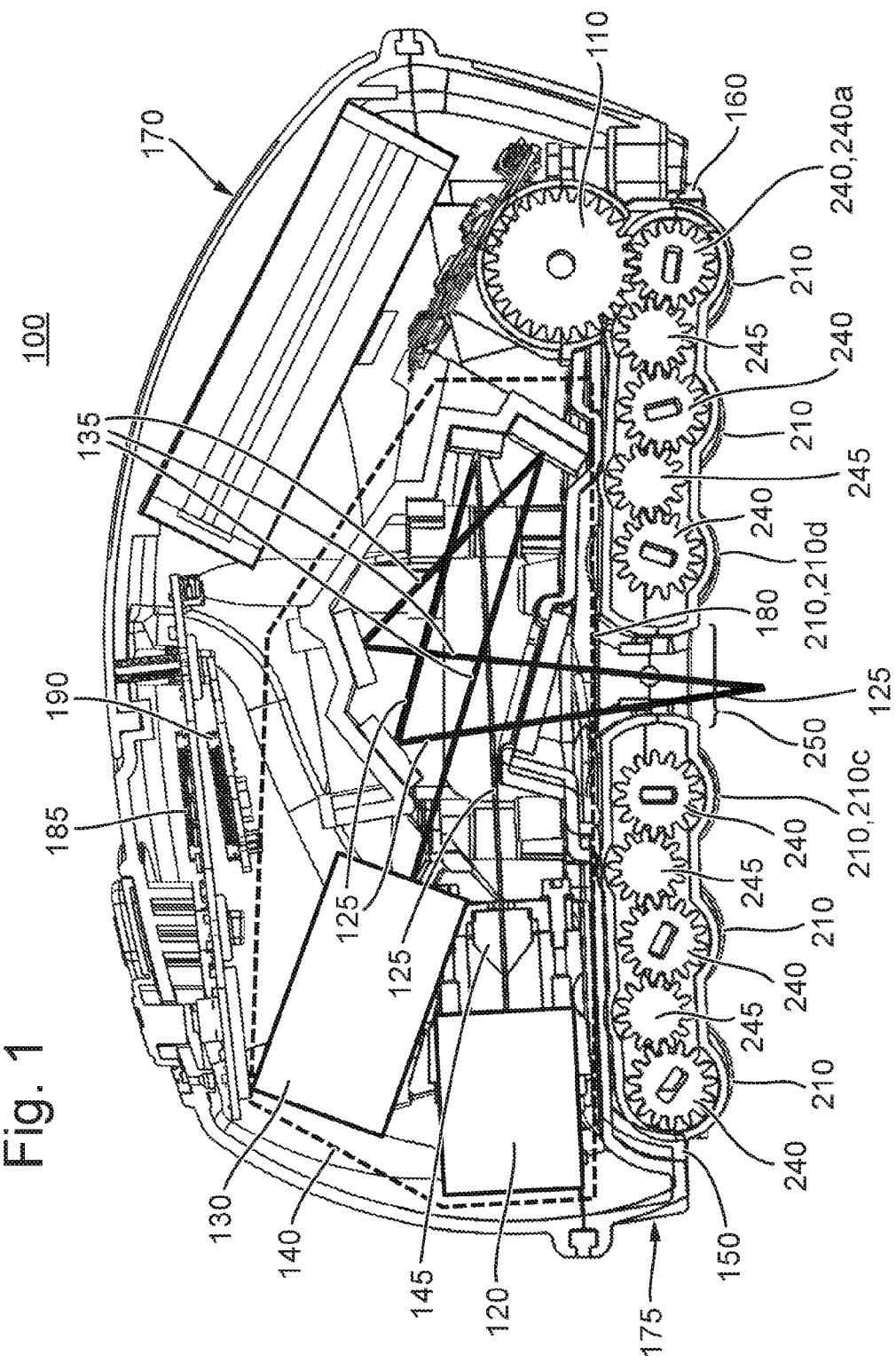
FIG. 1 is a cross-section along the length of a hand-held device according to an embodiment of the present invention.
Figure 5:
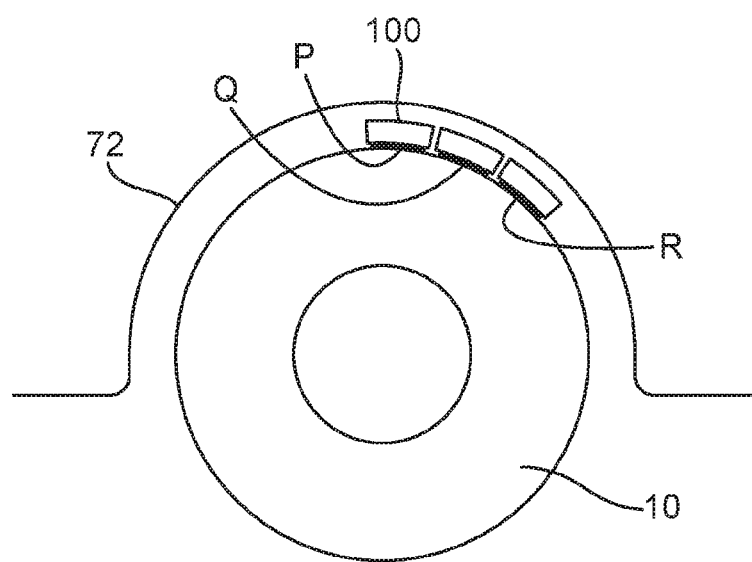
Figure 8A:
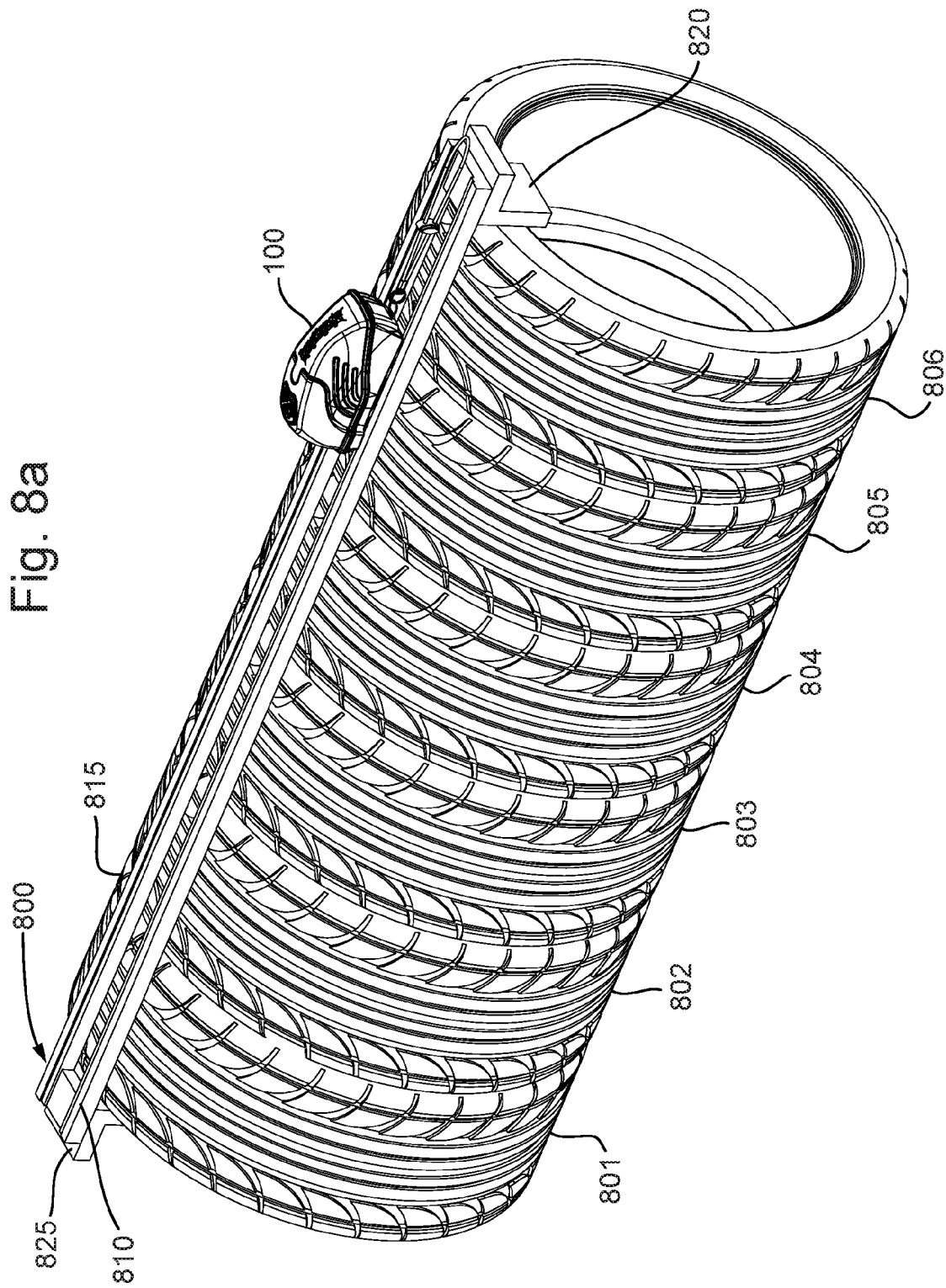
Figure 8B:
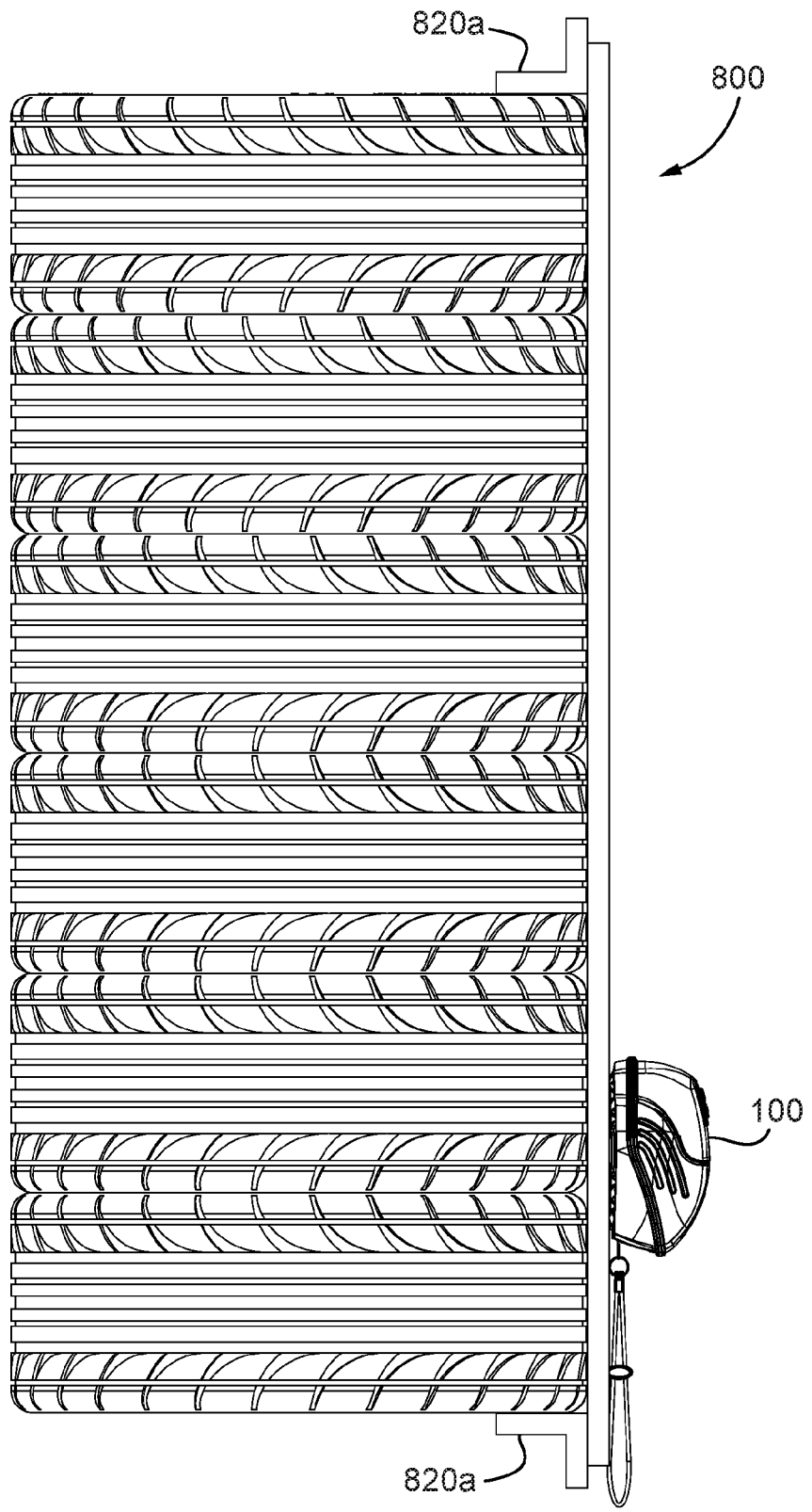

FIG. 5 also shows the hand-held device of FIG. 1 being used to obtain a three dimensional topological surface profile measurement around part of a tire's circumference;

FIG. 6 illustrates a system comprising an external device in communication with a hand-held device in accordance with an embodiment of the invention; and FIG. 7 illustrates the external device and the hand-held device of FIG. 6 when imaging a vehicle license plate;

FIG. 8a provides perspective view of a hand-held device in accordance with an embodiment of the present invention wherein the hand-held device is arranged to slide along a guide rail;

FIG. 8b provides a side view of the hand-held device and guide rail of FIG. 8a;

FIG. 8c provides an expanded view of the hand-held device and guide rail of FIG. 8a; and FIG. 9 provides an example of the relationship between stopping distance and tread depth which may be used to determine the stopping distance of a measured tire in accordance with embodiments of the present invention.

Figure 2:
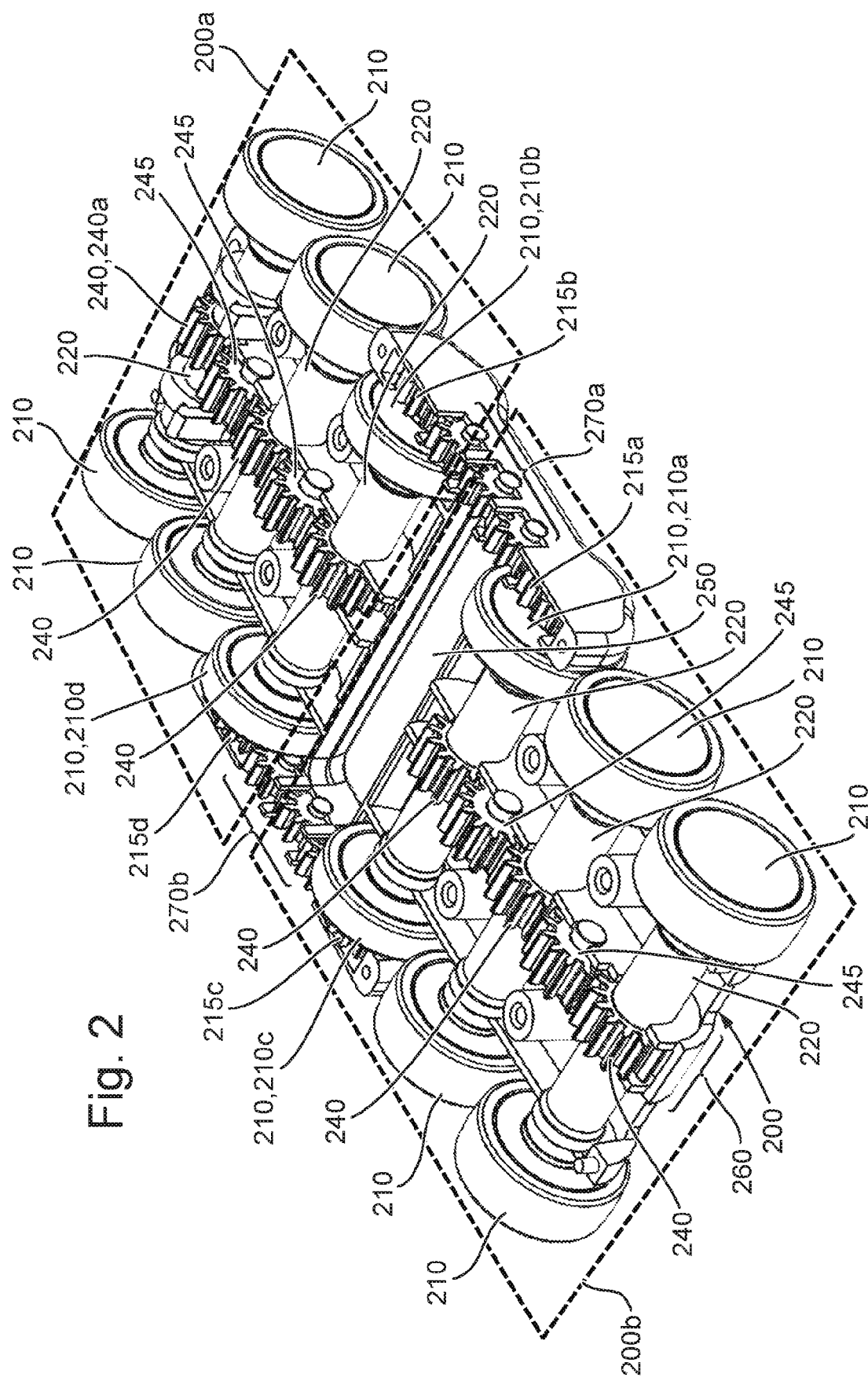
FIG. 2 is a perspective view of the guide wheel assembly of the hand-held device of FIG. 1.
Figure 3:
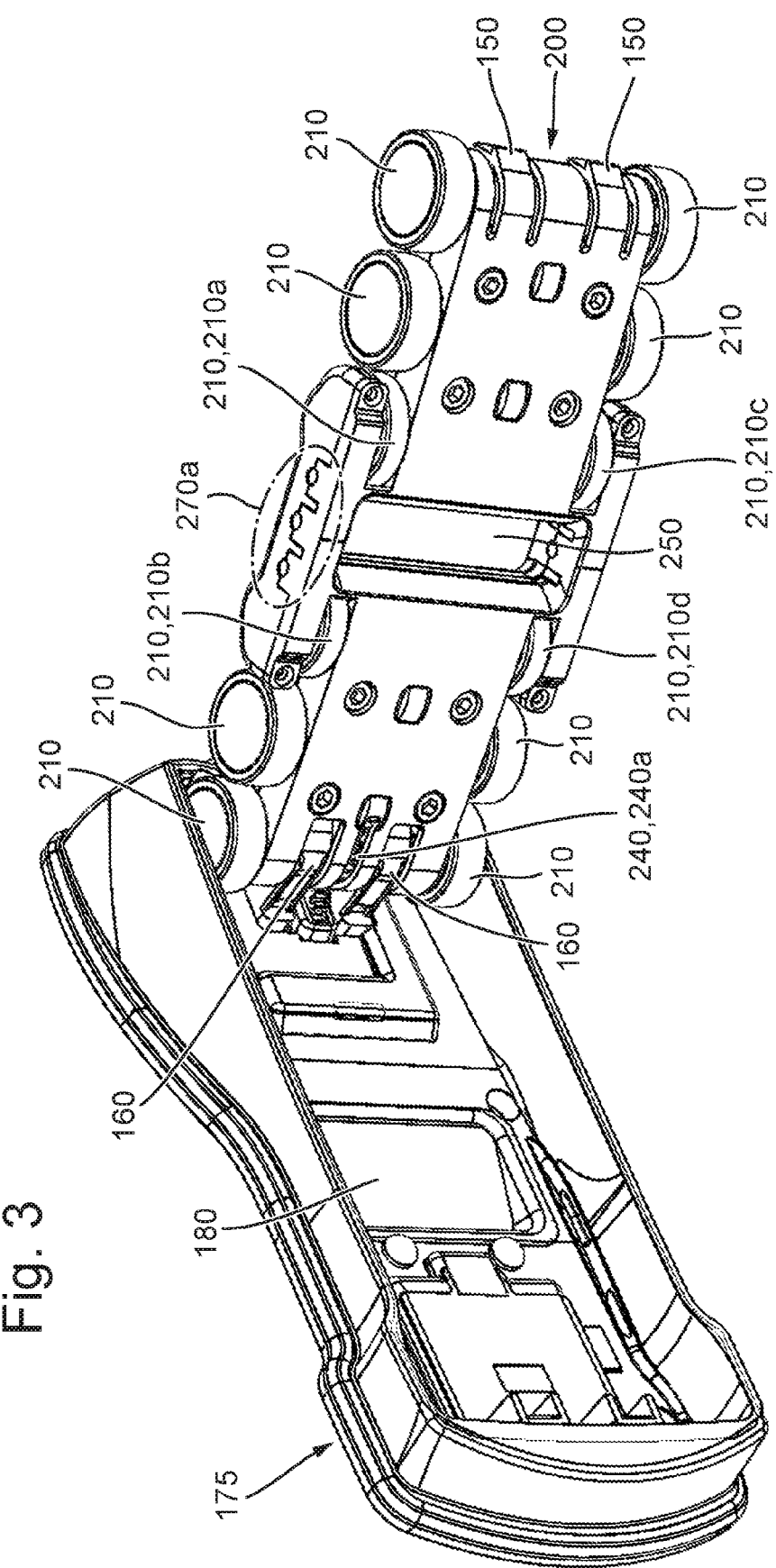
FIG. 3 is a perspective view of the guide wheel assembly of FIG. 2 when hinged away from the housing.

Referring to FIGS. 1 to 3 of the accompanying drawings, the hand-held device 100 comprises a magnetic rotary encoder assembly 110, a laser light source 120, a detector 130, a light guiding assembly 140, a top housing 170, a bottom housing 175, and a guide wheel assembly.

As seen best in FIG. 2, the guide wheel assembly comprises six guide wheel pairs. Each guide wheel pair comprises an axle 220 having two opposing ends, a guide wheel 210 rigidly attached to each end of the axle 220, and an axle gear 240 arranged midway along the length of the axle 220. Optionally, as best seen in FIG. 2a, the guide wheels 210 of each guide wheel pair may be attached to the axle 220 via a respective wheel bearing 201.

The guide wheel assembly also comprises a base 200 having a transverse viewing aperture 250 and a longitudinal trough 260. As illustrated in FIG. 2, the trough 260 is positioned midway along the width of the base 200 and extends along the length of the base 200. The viewing aperture 250 is positioned in the middle of the base 200 and separates the base 200 into a front half region 200a and a rear half region 200b (the designation front and rear having no particular significance). Three guide wheel pairs are rotatably mounted to and equally spaced apart in the front half region 200a of the base 200. Another three guide wheel pairs are rotatably mounted to and equally spaced apart in the rear half region 200b of the base 200. The axle gears 240 of each guide wheel pair are rotatably positioned in the trough 260. When the hand-held device 100 moves along the tire surface the guide wheel pairs rotate on their respective rotatable mounts.

The guide wheel assembly also comprises inner connecting gears 245 rotatably mounted in the trough 260 to mesh adjacent axle gears 240 together.

The meshed inner connecting gears 245 and axle gears 240 in the rear region 200*b* of the base form a rear region gear train (sometimes referred to herein as a rear region transmission). It will be appreciated that the rear region gear train transmits torque between the inner connecting gears 245 and the axle gears 240 and, in this way, couples the rear region guide wheel pairs together such that they rotate together with the same speed and direction when any one of the guide wheel pairs rotate. In other words, for example, the rear region gear train transmits the rotation of any one of the rear region guide wheel pairs to the other guide wheel pairs in the rear region 200*b*.

In a similar manner, the meshed inner connecting gears 245 and axle gears 240 in the front region 200*a* of the base forms a front region gear train (sometimes referred to herein as a front region transmission). The front region gear train transmits torque between the inner connecting gears 245 and the axle gears 240 and, in this way, couples the front region 200*a* guide wheel pairs together such that they also rotate together with the same speed and direction when any one of the guide wheel pairs in the front region 200*a* rotate.

The guide wheel assembly also comprises an outer connecting gear 270*a* and two guide wheel gears 215*a*, 215*b* for coupling the front gear train together with the rear gear train. The guide wheel gears 215*a*, 215*b* are mounted on the outer faces of guide wheels 210*a*, 210*b* which, as illustrated in FIG. 2, are adjacent to a right end face of the viewing aperture 250. The outer connecting gear 270*a* is rotatably mounted to the base 200 to mesh the adjacent guide wheel gears 215*a*, 215*b* together. The meshed outer connecting gear 270*a* and guide wheel gears 215*a*, 215*b* form an outer right-side gear train (sometimes referred to herein as an outer right-side transmission).

It will be appreciated that the outer right-side gear train couples the front region 200*a* guide wheel pairs together with the rear region 200*b* guide wheel pairs such that the outer right-side gear train, front region gear train, and rear region gear train all rotate together with the same speed and direction when any one of the guide wheel pairs in the top region 200*a* or bottom region 200*b* rotate. In other words, it will be appreciated that the outer right-side gear train transmits rotation between the front gear train and the rear gear train to rotate all of the guide wheel pairs together.

Additionally or alternatively, the guide wheel assembly may also comprise a second outer connecting gear 270*b* together with guide wheel gears 215*c*, 215*d* mounted on the outer faces of the guide wheels 210*c*, 210*d* that are adjacent to a left end face of the viewing aperture 250 (the left end face of the viewing aperture being directly opposite to the right end face of the viewing aperture). The second outer connecting gear 270*b* is rotatably mounted to the base 200 so as to mesh the adjacent guide wheel gears 215*c*, 215*d* together. The meshed outer connecting gear 270*b* and guide wheel gears 215*c*, 215*d* form an outer left-side gear train (sometimes referred to herein as an outer left-side transmission). It will be appreciated that the outer left-side gear train also couples the front region 200*a* guide wheel pairs together with the rear region 200*b* guide wheel pairs such that all three gear trains rotate together with the same speed and direction when any one of the guide wheel pairs in the front region 200*a* or rear region 200*b* rotate.

Rotating the guide wheel pairs together in the above manner provides a number of benefits including, for example, enabling the device to move more easily over difficult surfaces such as bumps, depressions, side wall edges, and curved surfaces of the tire; as compared to individually rotating guide wheel pairs. In addition, this feature also ensures that every axle rotates whenever one of the guide wheel pairs rotates—this is advantageous for more reliably determining how far the hand-held device 100 has travelled, as described further below.

A further advantage of the outer right-side gear train and, optionally, the outer left-side gear train is that the arrangement does not obstruct the light path 125 between the laser light source 120 and the tire, and the light path 135 between the tire to the detector 130, In other words, by arranging an outer gear train (i.e. outer right-side gear train and/or outer left-side gear train) to couple the front gear train and the rear gear train together, there are no axles 220, axle gears 240, inner connecting gears 245, guide wheels 210, guide wheel gears 215*a*, 215*b*, or outer connecting gears 270*a*, 270*b* obstructing the area defined by the viewing aperture 250.

The magnetic rotary encoder assembly 110 comprises an encoder gear that meshes with the axle gear 240*a* of a front guide wheel pair. The front guide wheel pair corresponds to the guide wheel pair in the front region 200*a* of the base 200 that is the furthest away from the viewing aperture 250.

The encoder gear is arranged to rotate with the rotation of the front-most guide wheel pair. However, since the front-most guide wheel pair is arranged to rotate together with the other five guide wheel pairs as described above, it will be appreciated that the encoder gear is also arranged to rotate with the rotation of any one of the other five guide wheel pairs.

The rotary encoder assembly 110 also comprises one or more magnets (not shown) positioned on the encoder gear, and a magnetic field detector. The one or more magnets and the magnetic field detector are positioned such that a peak magnetic field overlap between them occurs at least once every full rotation, or partial rotation, of the rotary encoder. Every time a peak magnetic overlap occurs, the magnetic rotary encoder assembly 110 generates a signal. The signal enables a processor 190 to determine a cumulative count of how many full or partial rotations of the encoder gear have occurred since the encoder gear started to rotate or since a particular point in time. It will of course be appreciated that other rotary encoder assemblies may be used instead of the magnetic rotary encoder to measure the rotation of the front guide wheel pair and provide a corresponding signal.

The rotary encoder assembly 110 communicates the signal to a processor 190 located within the hand-held device 100. The processor 190 is clocked to an internal clock and determines the distance over which the hand-held device 100 moves based upon the signal and the fact that the hand-held device 100 moves by a set amount every time the signal is generated. The determined distance is stored in a memory unit 185 together with imaging data (i.e. sample data) that was acquired by the detector 130 during the movement of the hand-held device. The acquisition of the imaging data is discussed in more detail below. The processor 190 may use the determined distance together with the imaging data from the detector 130 to map the imaging data onto an idealized tire model to generate a three dimensional surface profile image of the tire surface which is imaged by the hand-held device. The generated image may be sent from the processor 190 to a display unit such as a monitor or a smartphone for display. Optionally, as discussed in more detail below, the processor 190 may also determine one or more of wheel alignment information, tire inflation information, and stopping distance information based on the imaging data and the signal generated by the rotary encoder. Additionally or alternatively, the rotary encoder assembly 185 may comprise an input-output interface such as a wireless transceiver. As illustrated in FIG. 6, the input-output interface may communicate the signal generated by the rotary encoder assembly 110 together with the imaging data (i.e. sample data) generated by the detector 130 to an external processing means in an external device 400 (e.g. a computer terminal or a mobile device such as a smartphone) that is remotely located from the hand-held device 100. In some examples, it will be appreciated that the external processing means may generate and display a three dimensional surface profile image of the tire surface and optionally send it to the hand-held device 100 for storage. Preferably, the input-output interface of the hand-held device 100 communicates with the external device 400 via a P2P connection 300 or other direct connection. However, the input-output interface may alternatively communicate with the external device 400 over a network 310—e.g. a Local Area Network (LAN) or a Wider Area Network (WAN).

Optionally, as discussed in more detail below, the external device 400 may also determine one or more of: wheel alignment information; tire inflation information; and stopping distance information based on the imaging data and the rotary encoder signal data received from the hand-held device 100. As mentioned previously, the imaging data and the rotary encoder signal data form part of the measurement data obtained by the hand-held device 100.

As illustrated in FIGS. 1 and 3, the base 200 is connected to the bottom housing 175 via a hinge connector 160 and a clip connector 150. The hinge connector allows the base to rotate away from the bottom housing 175 when the clip connector 150 is released, as illustrated in FIG. 3. By rotating the base away from the bottom housing 175, the viewing aperture 250 defined in the base 200 and an access aperture 180 defined in the bottom housing 175 can be easily accessed for cleaning and maintenance. The access aperture 180 defined in the bottom housing 175 is large enough to allow access to the light guiding assembly 140 and, optionally the laser light source 120 and/or detector 130, for cleaning and maintenance (such as alignment) of the components therein.

The lighting assembly 140 is arranged to receive light from the laser light source 120 and direct it through a Powell lens 145 to generate an elongate pattern of laser light. The lighting assembly 140 is also arranged to project the elongate pattern of laser light out of the device 100 through the access aperture 180 and the viewing aperture 250. The optical path 125 along which the elongate pattern of laser light is projected out of the device by the lighting assembly 140 is such that, in use, the projected elongate pattern of laser light falls incident onto the tire surface (or any other underlying surface upon which the device 100 sits) at an angle that is not parallel with the direction of movement of the device 100.

The detector 130 is arranged to image the projected elongate pattern of laser light on the tire surface by imaging the surface of the tire along optical path 135. Optical path 135 is separate to optical path 125 and forms an angle with the tire surface that is different to that formed by optical path 125. The detector is clocked to the internal clock and samples the imaged data (i.e. projected elongate pattern of laser light on the tire surface) according to a fixed period such as, for example, once every 0.1 seconds. Alternatively, the detector may sample the imaged data according to a variable time period such as, for example, a period set in dependence on the speed at which the hand-held device 100 moves (e.g. the detector may sample the imaged data more often when the speed at which the device 100 moves across a surface increases). This may avoid the need for mapping the imaging data using the movement data at a later time.

The detector 130 provides the sampled image data to the memory unit 185. The memory unit 185 is connected to the internal clock and stores the sampled data together with the distance travelled by the hand-held device when each sample was taken. Optionally, the memory unit 185 may also store the time at which each sample was taken in the sampled data. The distance the hand-held device 100 travels is determined by the processor using the signal from the encoder assembly 110, as set out above.

As mentioned above, the processor 190 may use the data in the memory unit 185 to generate a three dimensional surface profile image of the tire surface which is imaged by the hand-held device by mapping the imaging data onto a base tire structure.

Additionally or alternatively, it will be appreciated that the processor 190 may use the sampled data from the detector 130 to generate a surface depth profile measurement of the tire surface imaged by the hand-held device using known techniques such as distortion-based surface depth measurements.

Optionally, the processor 190 may store the generated three dimensional surface profile image of the tire surface in the memory unit 185. The stored three dimensional surface profile image of the tire surface may be stored together with a time stamp and an identifier. In a further embodiment, the processor 190 may retrieve one or more stored three dimensional surface profile images of the tire surface from the memory unit 185 based on the identifier and the time stamp. The processor 190 may compare the retrieved image(s) with a more recently taken three dimensional surface profile image of the tire surface and, based on the differences between the images and recent image, estimate how quickly the tire is wearing and when it will need replacing. In addition, the processor may identify regions of the tire that are wearing more quickly than other regions of the tire.

Additionally or alternatively, the processor 190 may compare a recently generated three dimensional surface profile image of the tire surface with an image stored in a remote device such as a smartphone or data server. Optionally, the processor 190 may send a generated three dimensional surface profile image of the tire surface to a remote device (e.g. data server or smartphone) for storage.

Alternatively, the processor 190 may receive the signal from the encoder assembly 110 and the sampled data from the detector 130 directly to generate a three dimensional surface profile image of the tire surface. It will be appreciated that in this example, the processor 190 may generate the three dimensional surface profile image of the tire surface in real-time as the hand-held device is being moved. It will be understood that real-time is taken to mean that the three dimensional surface profile image of the tire surface is generated as the hand-held device is being moved over the surface of the tire, rather than after the hand-held device has finished moving over the surface of the tire.

Additionally or alternatively, the processor 190 may analyze the relative tread depth between at least two different points/regions in the 3D surface profile to determine wheel alignment information. For example, the processor may determine the relative tread depth between the center of the tire's rolling surface and the tire's outer/inner facing sidewall. The slope in the tread depth from the center to the outer/inner sidewall may be used to determine the so-called camber-alignment of the tire. For example, if the slope in the tread depth from the center of the tire to its outer side wall is negative, then the tire has a positive-camber alignment and the degree of the slope can be used to determine the positive-camber angle relative to a flat ground or a known axle orientation. Similarly, if the slope is positive, then the tire has a negative-camber alignment and the degree of the slope can be used to determine the negative-camber angle relative to a flat ground or a known axle orientation.

To determine whether the tire has a so-called toe-in or a toe-out alignment, the processor 190 may in some examples determine whether the tread depth across inner/outer sidewall region of the 3D surface profile slopes more than the center region of the 3D surface profile. If the outer sidewall slopes more than the center region, the processor 190 determines that the tire has a toe-in alignment. If the inner sidewall slopes more than the center region, the processor 190 determines that the tire has a toe-out alignment. The extent of the sidewall slope may be used to determine the toe-in/toe-out angle.

If the processor determines that there are patches of smaller tread depth in the center region (compared to other regions of the center region) of the 3D surface profile, the processor 190 determines that the tire is not balanced.

Additionally or alternatively, the processor 190 may analyze the relative tread depth between at least two different points/regions in the 3D surface profile to determine tire inflation information.

For example, if the tread depth in the center region of the 3D surface profile is smaller (i.e. more worn) than the outer and the inner sidewalls of the tire, then the processor determines that the tire is overinflated. If the tread depth in the inner and the outer sidewall regions of the 3D surface profile is smaller than the center region, the processor determines that the tire is underinflated.

Optionally, the processor 190 may compare the determined wheel alignment information and/or the determined tire inflation information with optimum settings for the tire. The optimum settings may be stored in the hand-held device 100, or they may be inputted into the hand-held device 100 via an input means (e.g. a camera, touch screen input, a serial input or a wireless input). The optimum settings provide ideal values for the tire alignment and/or inflation based on the tire make, tire size, tire age, tire wear-condition, and/or the type of the vehicle on which the tire is fitted. Based on the comparison, the processor 190 may determine one or more correction/adjustment values. The hand-held device 100 may output (e.g. display) these correction values.

For example, the processor 190 may display a command to correct the positive-camber angle based on the difference between the optimum positive-camber angle and the determined positive-camber angle. Similarly, the processor 190 may estimate how much the tire needs to be inflated based on the difference between a 3D tire surface scan of an optimally inflated tire and the determined 3D tire scan of an underinflated tire. Additionally, the processor 190 may be arranged to estimate the stopping distance of the vehicle based on a pre-determined correlation such as that shown in FIG. 9 between stopping distance and measured tread depth. The measured tread depth may correspond to the average tread depth measurements across an area of a single tire or a set of tires. In the former case, the average tread depth measurements may be of the most worn tire in a set of tires.

Optionally, in all embodiments described herein the laser light source comprises visible light.

Optionally, the clip connector 150 could be any type of quick release fastener such as a snap-fit fastener (e.g. push clip) or a push fit fastener but, alternatively, a screw-fit fastener (e.g. bolt fastener) could be used instead of the clip connector.

The processor 190 may comprise any suitable processing means, such as any one or more of: a microprocessor, a microcontroller, an ASIC, an FPGA, a DSP. Optionally, the processor 190 may comprise a local device, such as a desktop PC. Alternatively, the processor 190 may comprise a remote device, such as a server or a mobile device (e.g. a smartphone), or it may be distributed, such as comprising a cloud of servers.

The processor 190 may comprise a plurality of processors or sub-processors. The plurality of processors or sub-processors may carry out any of the processing functions described herein, including, for example: controlling the laser light source 120; determining the distance travelled; performing distortion based depth profile measurements; and/or generating a three dimensional surface profile image of the tire surface.

Optionally, the memory unit 185 may comprise software comprising instructions for instructing the processor 190 to carry out any of the steps described herein, including, for example: controlling the laser light source 120; determining the distance travelled; performing distortion based depth profile measurements; and/or generating a three dimensional surface profile image of the tire surface.

The memory unit 185 may comprise a plurality of memory units for storing the data described herein.

The respective locations of the processor 190 and the memory unit 185 illustrated in FIG. 1 have no particular significance. Accordingly, the processor 190 and memory unit 185 may be located at different respective locations within the hand-held device 100 than those illustrated in FIG. 1.

Figure 4:
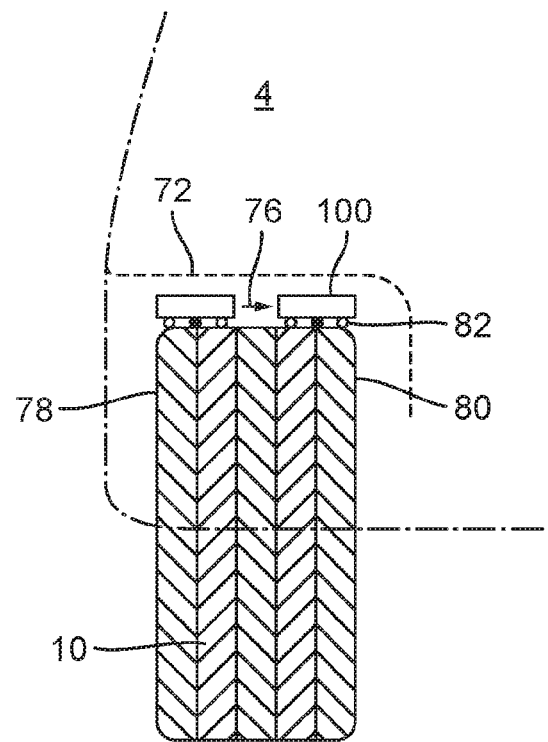
FIG. 4 shows schematically the hand-held device of FIG. 1 being used to obtain a three dimensional topological surface profile measurement across a width of a tire in situ on a stationary vehicle.

FIG. 4 shows a schematic front view of a tire 10 when it is mounted in a vehicle 4. Dotted line 72 indicates the vehicle wheel arch. During use, the hand-held device 100 projects an elongate pattern of laser light onto the surface of the tire. The hand-held device 100 is moved in the direction of the arrow 76 across the surface of the tire 10 from one sidewall 78 to the other sidewall 80. Whilst the hand-held device is being moved, the detector 130 images the projected elongate pattern of laser light on the surface of the tire 10 and samples the imaged data, e.g. once every 0.01 seconds. Whilst the hand-held device is being moved, the rotary encoder assembly 110 generates a signal as the front guide wheel pair rotates. The processor 190 determines the distance the hand-held device 100 travels at the time each sample was taken based on the signal generated by the encoder assembly 110. The sampled data and determined distance are stored in the memory unit as they are generated. When the hand-held device 100 reaches its destination at sidewall 80, the processor 190 retrieves the data in the memory unit 185 and uses the sampled data and determined distance measurements to generate a three dimensional surface profile image of the area of the tire over which the hand-held device moved (i.e. the surface of the tire 10 over which the hand-held device 100 moved when travelling from one sidewall 78 to the other sidewall 80). The generated three dimensional surface profile image is then sent to an external device, such as a smart phone or monitor, for display. It will be appreciated that the generated three dimensional surface profile image comprises the surface depth profile over the area of the tire over which the hand-held device moved.

It will also be appreciated that the processor 190 may store the generated three dimensional surface profile image in memory, such as the memory unit 185 or an external memory unit. The processor 190 may subsequently retrieve the generated three dimensional surface profile image from memory and stitch it together with an image of an adjacent area of the tire. Alternatively, the processor 190 may subsequently retrieve the generated three dimensional surface profile image from memory and compare it with a more recent image of the same area of the tire for comparative measurements such as, for example, determining when a depth of the tire will reach a minimum safety limit.

FIG. 5 shows how the hand-held device 100 can be moved to different positions on the circumference of the tire 10 to repeat the process described with respect to FIG. 4. Three possible positions P, Q and R are shown in FIG. 4. It will be appreciated that the process can be repeated for fewer or more positions, for example enough to cover the top half of the tire surface.

FIG. 6 show the hand-held device 100 communicating with an external device (e.g. a smartphone) 400 over a direct communication link 300 such as Bluetooth™. In this example, the hand-held device 100 sends image data and rotary encoder signal data to the external device 400 for generating a 3D tire surface scan. Optionally, the external device 400 may analyze the 3D tire surface scan to determine tire alignment information and/or tire inflation information. The external device 400 may further compare the determined tire alignment/inflation information with optimum settings so as to determine correction/adjustment values. The external device 400 may further compare measured tread depth data with a pre-determined relationship between measured tread depth and stopping distance so as to determine stopping distance information. The determined data may be outputted by displaying them on a screen 410 of the external device 400.

In this example, the external device 400 is configured to retrieve the optimum settings from stored memory. Alternatively, however, the optimum settings may be entered into the external device via the touch screen interface 410. As another alternative, the external device 400 may retrieve the optimum settings from an external database 320. The external database 320 may be accessed via a LAN/WAN network 310.

It will be appreciated that in other examples, the LAN/WAN network 310 may be used by the hand-held device 100 to communicate with the external device 400.

The optimum settings may be identified based on a vehicle license plate number. Accordingly, in some examples, the hand-held device 100 or the external device 400 may retrieve the optimum data based on the license plate number of the vehicle to which the tire is fitted. For example, the hand-held device 100 or the external device 400 may store optimum data for different types of vehicles, and may identify the correct optimum data by identifying the vehicle based on the vehicle's number plate.

In some examples, and as illustrated in FIG. 7, the hand-held device 100 and/or the external device 400 may obtain a vehicle's license plate number 706 by taking a picture of the vehicle's license plate 705 with an on-board camera 710, 720. The picture of the license plate 705 may be processed using a known automatic number plate recognition (ANPR) algorithm to extract the vehicle's license plate number 706. The vehicle's license plate number 706 may then be used by the hand-held device 100 or the external device 400 for retrieving optimum settings in connection with the vehicle.

FIGS. 8a-8c show a hand-held device 100 in accordance with the above aspects of the invention that is arranged to move along a guide rail 800.

The guide rail 800 comprises two spaced-apart parallel linear tracks 810, 815 (see FIGS. 8a and 8c). The linear tracks 810, 815 are joined together at their ends via a respective L-shaped bracket 820, 825. Each L-shaped bracket 820, 825 comprises a flange 820a, 825a that extends vertically away from the linear tracks 810, 815 (FIG. 8b-c). The flanges 820a, 825a are spaced apart so that six stacked tires 801-806 can fit between the flanges 820a, 825a. However, in other arrangements the flanges 820a, 825a may be spaced so that any other number of stacked tires can fit between them. Preferably, the flanges 820a, 825a are spaced apart so as to contact the outer facing sides of the outer tires 801, 806 in the stack of tires 801-806. Spacing the flanges apart in this way ensures that the guide rail 800 can be securely fitted onto the stack of tires 801-806.

Each linear track 810, 815 comprises a flat upper surface 810a, 815a. The linear tracks 810, 815 are spaced apart so that guide wheels 210 on the left-hand side of the hand-held device 100 rest on the upper surface 810a of one linear track 810, and guide wheels 210 on the right-hand side of the hand-held device 100 rest on the upper surface 815a of the other linear track 815. In this way, it will be appreciated that in this arrangement the guide wheels 210 of the hand-held device 100 may rotate along the linear tracks 810, 815 of the guide rail 800 when scanning the surface of the stacked tires 801-806. This results in more accurate scanning as the linear tracks 810, 815 of the guide rail 800 guide the hand-held device 100 along a straight path across the stacked tires 801-806.

Optionally, each upper surface 810a, 815a may comprise a raised outer facing edge 810b, 815b (see FIG. 8c). The height of each raised edge 810b, 815b may be arranged so as to contact the hand-held device 100—e.g. they may contact the bottom housing 175 of the hand-held device 100, or more preferably the underside of the bottom housing 175. In this way, the hand-held device 100 may be more securely supported as it is slid along the guide rail 800, It will be appreciated by those skilled in the art that the invention has been illustrated by describing several specific embodiments thereof, but is not limited to these embodiments. Many variations and modifications are possible, within the scope of the accompanying claims.

What is claimed is:

1. A method of obtaining a three-dimensional topological surface profile of a tire using a device, the method comprising:
   projecting, from the device, a pattern of light onto a surface of the tire;
   imaging, by a detector of the device, at least of portion of the projected pattern reflected from the surface of the tire;
   using a rotary encoder of the device to determine relative movement between the device and the tire; and
   using a wireless transceiver to communicate measurement data from the device to an external device, wherein the measurement data comprises imaging data obtained by the detector and signal data generated by the rotary encoder.

2. The method as claimed in claim 1, wherein using a wireless transceiver to communicate with an external device to provide measurement data to the external device comprises providing the imaging data obtained by the detector and the signal data generated by the rotary encoder to a computer terminal or a cloud-based network for generating the three-dimensional topological surface profile of the tire.

3. The method as claimed in claim 2, wherein the computer terminal is located remotely from the device and powered remotely from the device.

4. The method as claimed in claim 1, further comprising establishing a direct connection between the device and the external device.

5. The method as claimed claim 4, wherein the direct connection is a peer-to-peer connection.

6. The method as claimed in claim 1, the method further comprising communicating with the external device via a Local Area Network or a Wide Area Network.

7. The method as claimed in claim 1, further comprising receiving, by the device, a three-dimensional topological surface profile of a tire for storage.

8. The method as claimed in claim 7, wherein the received three-dimensional topological surface profile of a tire corresponds to measurement data that the device has taken and communicated for generating the three-dimensional topological surface profile of a tire remotely.

9. The method as claimed in claim 1, further comprising generating a three-dimensional topological surface profile of the tire using data obtained from an image of the surface of the tire and the signal generated by the rotary encoder.

10. The method as claimed in claim 9, further comprising identifying tire side walls by analysing the directionality of the signal generated by the rotary encoder to determine the position of an outer edge and an inner edge of the tire.

11. The method as claimed in claim 1, further comprising using the external device to determine one or more of: a three-dimensional topological surface profile of the tire; wheel alignment information; tire inflation information; and stopping distance information.

12. The method as claimed in claim 1, further comprising using the wireless transceiver to provide processed measurement data to the external device.

13. The method as claimed in claim 1, wherein the pattern of light is an elongate pattern of light.

14. A device for obtaining a three-dimensional topological surface profile of a tire, wherein the device is configured to project a pattern of light onto a surface of the tire, the device comprising:
a detector configured to image at least of portion of the projected pattern reflected from the surface of the tire;
a rotary encoder configured to determine relative movement between the device and the tire; and
a wireless transceiver configured to communicate with an external device to provide measurement data to the external device, wherein the measurement data comprises imaging data obtained by the detector and signal data generated by the rotary encoder.

15. The device as claimed in claim 14, further comprising:
a plurality of pairs of guide wheels mounted on a base; and
a linking assembly configured to collectively rotate the guide wheels together.

16. The device as claimed in claim 14, further comprising at least one processor configured to generate a three-dimensional topological surface profile of the tire using data obtained from an image of the surface of the tire and the signal generated by the rotary encoder.

17. The device as claimed in claim 16, wherein the at least one processor is further configured to identify tire side walls by analysing the directionality of the signal generated by the rotary encoder to determine the position of an outer edge and an inner edge of the tire.

18. The method as claimed in claim 1, comprising receiving, by the external device, at least one of:
i) vehicle information relating to a vehicle on which the tire is mounted or is mountable; and
ii) tire information relating to the tire.

19. The method as claimed in claim 18, comprising the external device receiving the vehicle information or the tire information from a database that is external from the device and external from the external device.

20. The method of claim 18, further comprising the external device using the measurement data and at least one of the vehicle information and the tire information to determine at least one of:
i) wheel alignment information;
ii) tire inflation information; and
iii) stopping distance information.

21. A method of using an apparatus comprising a light source and a detector, the method comprising:
projecting, by the light source, a pattern of light onto a surface of a tire;
imaging, by the detector, at least of portion of the projected pattern reflected from the surface of the tire;
determining relative movement between the apparatus and the tire; and
communicating the measurement data from the apparatus to an external device, wherein the measurement data comprises imaging data obtained by the detector and signal data representing the relative movement between the apparatus and the tire;
the external device using the measurement data to determine at least one of:
i) wheel alignment information;
ii) tire inflation information; and
iii) stopping distance information.

22. The method of claim 21, further comprising receiving, by the external device, at least one of:
i) vehicle information relating to a vehicle on which the tire is mounted or is mountable; and
ii) tire information relating to the tire.

23. The method as claimed in claim 22, comprising the external device receiving the vehicle information or the tire information from a database that is external from the device and external from the external device.

24. The method of claim 22, comprising the external device using at least one of the vehicle information and the tire information together with the measurement data to determine at least one of the wheel alignment information; the tire inflation information; and the stopping distance information.

25. The method of claim 21, further comprising the external device determining a three-dimensional topological surface profile.

* * * * *